3,839,440
N-CYCLOALKENYL-N-ARYL-N'-ALKYL-UREAS
Wilfried Zecher and Ernst Roos, Cologne, and Rudolf
  Merten, Leverkusen, Germany, assignors to Bayer Aktiengesellschaft, Leverkusen, Germany
No Drawing. Filed Jan. 19, 1970, Ser. No. 4,125
Claims priority, application Germany, Jan. 22, 1969,
P 19 02 933.5
Int. Cl. C07c 127/16
U.S. Cl. 260—553 A                           4 Claims

ABSTRACT OF THE DISCLOSURE

Reacting ketimines of aromatic amines and cyclic ketones with aliphatic isocyanates, e.g. at temperatures of about —20 to +220° C., optionally in an inert organic solvent, to form the corresponding N-cycloalkenyl-N-aryl-N'-alkyl-ureas, all of which are new compounds and all of which may be used as cross-linking agents for isocyanates and serve as intermediates for the production of synthetic materials and as weed killers.

---

The present invention relates to and has for its objects the provision for particular new methods of reacting ketimines of aromatic amines and cyclic ketones with aliphatic isocyanates, e.g. at temperatures of about —20 to +220° C., optionally in an inert organic solvent, to form the corresponding N-cycloalkenyl-N-aryl-N'-alkyl-ureas, all of which are new compounds and all of which may be used as cross-linking agents for isocyanates or serve as intermediates for the production of synthetic materials, e.g. in a simple single step reaction, using readily available starting materials whereby to attain outstanding yields, with other and further objects of the invention becoming apparent from a study of the within specification and accompanying examples.

Among the ketimines of aliphatic amines and cyclic ketones, isocyanates can be added on, whereby to form alkenyl ureas. However, in the reaction of ketimines of aromatic amines with aromatic isocyanates and isothiocyanates, for example the reaction of 4-cyclohexylidenimino-chlorobenzene with 3,4-dichloro-phenylisocyanate, substituted cyclohexene-carboxanilides are formed rather than ureas (J. Org. Chem. 33, 2357 [1968]).

No process is presently known for producing N-cycloalkenyl-N-aryl-N'-alkyl-ureas.

The present invention provides new N-cycloalkenyl-N-aryl-N'-alkyl-ureas and a process for their preparation.

The present invention provides such a process in which ketimines of aromatic amines and cyclic ketones are reacted with aliphatic isocyanates at temperatures of —20 to +220° C., optionally in an inert organic solvent.

Suitable starting ketimines for use in the instant process are for example compounds of the general formula:

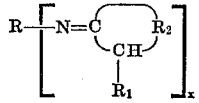   (1)

in which

R denotes an x-valent aryl radical which may optionally be substituted,
R₁ denotes hydrogen, a lower alkyl radical or a cyano group,
R₂ denotes a 3- to 18-membered, preferably 4-, 6-, 10-, 14- or 16-membered, aliphatic radicals which may optionally contain a double bond and which may optionally be substituted, and
x stands for 1 or 2.

Suitable starting aliphatic isocyanates are for example compounds of the general formula:

$$R_3(N=C=O)_y$$

in which

R₃ stands for a y-valent (optionally substituted) alkyl, alkenyl or aralkyl radical, in which at least one isocyanate group is attached to alkyl, and
y stands for 1 or 2.

The reaction course is therefore to be regarded as surprising since, according to the above-mentioned literature, ketimines of aromatic amines react with isocyanates via the carbon atoms in α-position to the ketimino group to give carbonamides. It was therefore not to be foreseen that with alkyl-substituted isocyanates the addition would take place via the enamine form of the ketimine on the nitrogen, and that cycloalkenyl-ureas would be formed instead.

As aryl radicals for R, those of benzene, naphthalene, anthracene, anthraquinone, diphenyl, diphenylmethane, diphenyl ether, toluene, xylene and di-tert.-butylbenzene are preferably used. These radicals may also be substituted one or more times, for example, by alkyl, haloalkyl, trichloromethyl, trifluoromethyl, hydroxy, halogen, nitro, alkoxy, dialkylamino, carboxy, carbalkoxy, sulphonic acid and cyano groups.

The aliphatic ring systems containing the radicals R₁ and R₂ may also be substituted, for example by lower alkyl or cyano or endoalkylene groups. Particularly preferred is a cyclo-pentane, -hexane, -heptane, -hexene or -heptadiene ring which may be substituted for example by alkyl, endoalkylene or cyano groups.

As alkyl or aralkyl radicals for R₃, preferably those of methane, hexane, hexadecane, propylene, cyclobutane, cyclohexane, toluene or xylene are used. These radicals may also be substituted by alkyl, halogen, cyano, nitro, alkoxy, dialkylamino, carboxy and carbalkoxy groups.

The preparation of the ketimines to be used according to the present invention as starting materials is well known and may be effected, for example, by condensation, possibly with the use of suitable catalysts, of cyclic ketones with primary aromatic amines.

As examples of ketimines to be used according to the present invention as starting materials, there may be mentioned those of the following formulae:

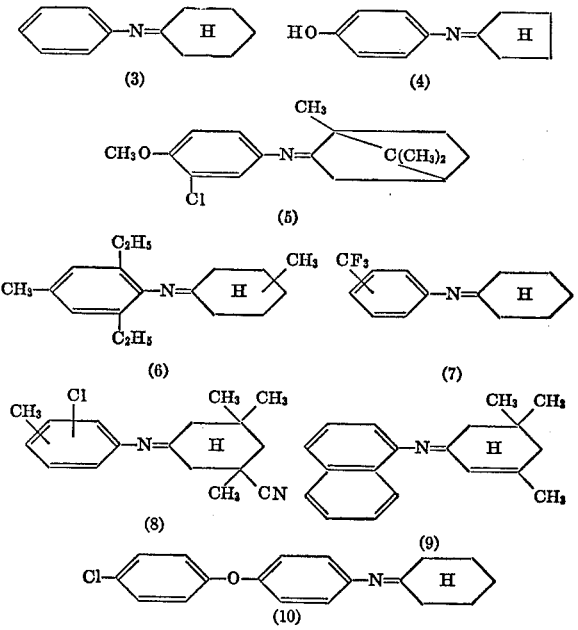

(11) [structure: CH₃-substituted phenyl with two N=H groups linked to phenyl rings]

(12) [structure: H-phenyl-N=...C(CH₃)₂...-N=phenyl-H]

Suitable starting alkyl-isocyanates, the preparation of which also takes place according to known processes, are for example CH₃—N=C=O  (13)
C₁₆H₃₃—N=C=O  (14)
phenyl—N=C=O with H  (15)
CH₂=CH—CH₂—N=C=O  (16)
Cl—CH₂—CH₂—N=C=O  (17)
C₂H₅—O—C(=O)—CH₂—N=C=O  (18)
benzene with CH₂—N=C=O groups  (19)

CH₃—[CH₂]₃—CH(N=C=O)—C(=O)—O—C₂H₅ with N=C=O  (19)(20)
phenyl-CH=CH₃ with N=C=O groups  (21)

(22) [structure with CH₃ groups and N=C=O groups, O=C=N—CH₂—cyclohexyl with CH₃ and —N=C=O]

The reaction according to the present invention is illustrated by the following formulae scheme:

phenyl—N=(H)(phenyl) + CH₃—N=C=O ⟶

[structure with phenyl-N-phenyl, O=C—NH—CH₃]  (23)

In general, the compounds which are obtained by this reaction can be represented by the following formula:

$$\begin{array}{c} A\text{---}R'\text{---}N\text{---}C\text{---}R_2 \\ B\text{---}R_3'\text{---}N\text{---}C \\ H \quad O \quad R_1 \end{array}$$  (24)

In this formula, $R_1$ and $R_2$ are the same as defined above, and A—R' and B—R₃' are A and B substituted radicals corresponding to R and $R_3$, respectively, in which A is hydrogen or the group $$\left[\begin{array}{c} R_3\text{---}N\text{---}C=O \\ | \quad \quad | \\ R_2\text{---}C\text{---}N\text{---} \\ \diagdown C \diagup \\ | \\ R_1 \end{array}\right]$$  (25)

and B is hydrogen or the group $$\left[\begin{array}{c} O=C\text{---}N \\ | \quad \quad | \\ R_2\text{---}C\text{---}N\text{---}R \\ \diagdown C \diagup \\ | \\ R_1 \end{array}\right]\text{---}$$  (26)

The instant reaction can be carried out with or without a solvent. Suitable solvents include inert organic solvents such as, for example, toluene, nitrobenzene, chlorobenzene, dioxan, acetonitrile, acetone, N-methyl-pyrrolidone, dimethyl sulfoxide, pyridine, tetramethylene-sulfone, and the like, or mixtures of such solvents.

Sometimes, for example when low-boiling isocyanates are used, it is advantageous to carry out the reaction in an autoclave, i.e., under autogenus pressure, as the artisan will appreciate.

The reaction temperature used is, in general, from substantially between about —20 to 220° C., preferably between about +10 to +150° C., and especially between about +40 to +150° C.

Suitably, the reaction is carried out in such a way that one of the two starting components, ketimine or isocyanate, is provided, optionally in a solvent, and the second component is then added dropwise at room temperature. Heating to the reaction temperature is subsequently effected, which in this case is preferably from +40 to +150° C., and the reaction is taken to completion at this temperature. However, it is also possible, particularly in the case of strongly exothermic reactions, not to introduce one of the two components until the reaction temperature has first been reached.

In general, one gram-equivalent of isocyanate is used per ketimino group, but in many cases it may also be advantageous to use the isocyanate in amounts greater or less than the stoichiometric amount.

Generally, when $x$ and $y$ are both 1 or are both 2, the ketimino and isocyanate starting compounds are preferably used in a molar ratio of 1:1, whereas when $x$ is 2 and $y$ is 1, such ratio is preferably 1:2, and when $x$ is 1 and $y$ is 2, such ratio is preferably 2:1.

The reaction in question can be carried out either continuously or batch-wise. The reaction course is accelerated by the optional presence of suitable catalysts, for example boron fluoride, zinc chloride, ferric chloride, triethylenediamine, trialkylphosphine, tin (II) octoate, dialkyl tin diacylate, and the like.

In general, the reaction products crystallize out as very pure products from the reaction mixture; if necessary they can be further worked up by recrystallization, e.g. from suitable solvents such as acetonitrile, ethyl acetate, light petroleum, and the like, or by distillation.

Advantageously, the compounds of the present invention, i.e. those obtained by the production process of the present invention, may be used in the conventional manner as cross-linking agents for isocyanates and, in addition, may serve as intermediates for the conventional production of synthetic materials.

For instance, the reaction of for example 1 mol of N-cyclohex - 1 - enyl-N-phenyl-N'-methyl-urea (i.e. prepared according to instant Example 1) with 3 mols of hexamethylene-diisocyanate for 3 hours at about 120° C. yields a polyfunctional isocyanate, the constitution of which is related to well known compounds (cf. French Pat. 1,565,833). These polyisocyanates (e.g. that formed from N-cyclohex - 1 - enyl-N-phenyl-N'-methyl-urea and hexamethylene diisocyanate as noted above) can be mixed with condensation products of adipic acid and ethylene glycol, optionally in the presence of a solvent, and such mixture can be spread out on a plain surface, such as a wooden surface, to give, when set, clear, firm and solid lacquer films. These films are useful in the wood furniture field to provide attractive, surface-protected wood-containing articles.

The present invention therefore concerns a process which comprises reacting a ketimine of the formula

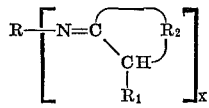

in which

R is selected from the group consisting of x-valent aryl having 6–14 ring carbon atoms; x-valent lower alkylene-bis-aryl having 6–14 ring carbon atoms in each aryl moiety; x-valent diaryl ether having 6–14 ring carbon atoms in each aryl moiety; and each such x-valent aryl having 6–14 ring carbon atoms, x-valent lower alkylene-bis-aryl having 6–14 ring carbon atoms in each aryl moiety and x-valent diaryl ether having 6–14 ring carbon atoms in each aryl moiety which is correspondingly substituted with 1–3 substituents individually selected from the group consisting of lower alkyl, halo lower alkyl, hydroxy, halo, nitro, lower alkoxy, di lower alkyl amino, carboxy, carbo lower alkoxy, sulfonic acid, cyano and keto;

$R_1$ is selected from the group consisting of hydrogen, lower alkyl and cyano;

$R_2$ is selected from the group consisting of divalent saturated aliphatic chain having 3–18 carbon atoms; divalent aliphatic chain having 3–18 carbon atoms and one double bond; and each such divalent saturated aliphatic chain having 3–18 carbon atoms and divalent aliphatic chain having 3–18 carbon atoms and one double bond which is correspondingly substituted with 1–4 substituents individually selected from the group consisting of lower alkyl, cyano and endo lower alkylene bridge; and $x$ is a whole number from 1–2;

with an isocyanate of the formula

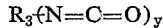

in which $R_3$ is selected from the group consisting of y-valent alkyl of 1–16 carbon atoms; y-valent lower alkenyl; y-valent cycloalkyl having 5–6 ring carbon atoms; y-valent cycloalkyl-lower alkyl having 5–6 ring carbon atoms in the cycloalkyl moiety; y-valent aryl-lower alkyl having 6–10 ring carbon atoms in the aryl moiety and at least one corresponding N—C=O linkage in the lower alkyl moiety; y-valent lower alkyl-aryl-lower alkyl having 6–10 ring carbon atoms in the aryl moiety and at least one corresponding N—C=O linkage in one of the lower alkyl moieties; and each such y-valent alkyl of 1–16 carbon atoms, y-valent lower alkenyl, y-valent cycloalkyl having 5–6 ring carbon atoms, y-valent cycloalkyl-lower alkyl having 5–6 ring carbon atoms in the cycloalkyl moiety, y-valent aryl-lower alkyl having 6–10 ring carbon atoms in the aryl moiety and y-valent lower alkyl-aryl-lower alkyl having 6–10 ring carbon atoms in the aryl moiety which is correspondingly substituted with 1–3 substituents individually selected from the group consisting of lower alkyl, halo, cyano, nitro, lower alkoxy, di lower alkyl amino, carboaryloxy having 6–10 carbon atoms in the aryloxy moiety and carbo lower alkoxy; and $y$ is a whole number from 1–2;

at a temperature substantially between about −20 to +220° C., to form the corresponding N,N'-substituted area of the formula

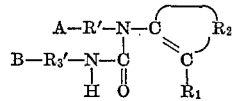

in which $R_1$ and $R_2$ are the same as defined above,

A—R'— is an A-substituted radical corresponding to R in which A is hydrogen when $x$ is 1, and the radical of the formula

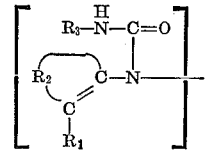

in which $R_1$, $R_2$ and $R_3$ are the same as defined above when $x$ is 2; and B—$R_3'$— is a B-substituted radical corresponding to $R_3$ in which B is hydrogen when $y$ is 1, and the radical of the formula

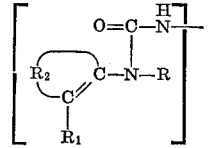

in which R, $R_1$ and $R_2$ are the same as defined above when $y$ is 2.

The present invention also contemplates as new compounds such N,N'-substituted ureas formed in accordance with the foregoing process.

Advantageously, in accordance with one embodiment of the present invention, in the various formulae herein:

R represents x-valent aryl having 6–14 ring carbon atoms, including mono-, di- and tri-nuclear aryl, such as phenyl, naphthyl, anthracyl (e.g. including anthraquinonyl), diphenyl, and the like;

x-valent lower alkylene-bis-aryl having 6–14 ring carbon atoms in each aryl moiety, including mono-, di- and tri-nuclear aryl and straight and branched alkylene, such as methylene-, dimethylene-, trimethylene-, tetramethylene-, bis-phenyl, bis-naphthyl, bis-anthracyl, and the like, especially $C_{1-4}$ or $C_{1-3}$ or $C_{1-2}$ alkylene-bis-phenyl, and particularly diphenylmethane or methylene-bis-phenyl, diphenyl-dimethyl-methane or dimethyl-methylene-bis-phenyl, etc.;

x-valent diaryl ether having 6–14 ring carbon atoms in each aryl moiety, or x-valent aryloxy aryl having 6–14 ring carbon atoms in the aryloxy moiety and 6–14 ring carbon atoms in the aryl moiety, including mono-, di- and tri-nuclear aryl and/or aryloxy, such as phenoxy phenyl, naphthyloxy phenyl, anthracyloxy phenyl, phenoxy naphthyl, naphthyloxy naphthyl, anthracyloxy naphthyl, phenoxy anthracyl, naphthyloxy anthracyl, anthracyloxy anthracyl, and the like; or such x-valent aryl having 6–14 ring carbon atoms, x-valent lower alkylene-bis-aryl having 6–14 ring carbon atoms in each aryl moiety and x-valent diaryl ether having 6–14 ring carbon atoms in each aryl moiety which is substituted with 1–3 or 1–2 (or only 1) substituents individually (i.e. same or mixed) selected from the group consisting of straight and branched lower alkyl such as methyl, ethyl, n- and iso-propyl, n-, iso-, sec.- and tert.-butyl, and the like, especially $C_{1-4}$ or $C_{1-3}$ or $C_{1-2}$ alkyl (e.g. xyleneyl or xylyl, toluene or tolyl, di-tert.-butyl-phenyl, etc.);

straight and branched halo lower alkyl such as mono, di and tri chloro, bromo, iodo and/or fluoro (i.e. same or mixed) substituted methyl to tert.-butyl inclusive as defined above, and the like, especially mono to tri halo substituted $C_{1-4}$ or $C_{1-3}$ or $C_{1-2}$ alkyl, and more especially trifluoromethyl, trichloromethyl, etc.;

hydroxy;

halo such as chloro, bromo, iodo and fluoro;

nitro;

straight and branched chain lower alkoxy such as methoxy, ethoxy, n- and iso-propoxy, n-, iso, sec.- and tert.-butoxy, and the like, especially $C_{1-4}$ or $C_{1-3}$ or $C_{1-2}$ alkoxy;

di straight and branched chain lower alkyl amino such as di (same or mixed) methyl to tert.-butyl inclusive as defined above, and the like, -amino, especially di $C_{1-4}$ or $C_{1-3}$ or $C_{1-2}$ alkyl amino;

carboxy, i.e. —COOH;

carbo straight and branched chain lower alkoxy, i.e. lower alkoxy carbonyl, such as carbo methoxy to tert.-butoxy inclusive as defined above, and the like, especially carbo $C_{1-4}$ or $C_{1-3}$ or $C_{1-2}$ alkoxy, i.e. $C_{1-4}$ or $C_{1-2}$ or $C_{1-2}$ alkoxy-carbonyl;

sulfonic acid, i.e. —HSO$_3$;

cyano; and/or keto, especially diketo (e.g. anthraquinonyl);

$R_1$ represents hydrogen;

straight and branched chain lower alkyl such as methyl to tert.-butyl inclusive as defined above, and the like, especially $C_{1-4}$ or $C_{1-3}$ or $C_{1-2}$ alkyl; or cyano;

$R_2$ represents divalent saturated aliphatic chain having 3–18 carbon atoms such as tri- to octadeca- methylene, especially $C_{3-18}$ or $C_{3-14}$ or $C_{3-10}$ or $C_{3-6}$ or $C_{3-5}$ alkylene, more especially $C_3$, $C_4$, $C_5$, $C_6$, $C_{10}$ and $C_{14}$ alkylene, and most especialy trimethylene, tetramethylene and pentamethylene;

divalent aliphatic chain having 3–18 carbon atoms and one double bond such as tri- to octadecamethylene containing one double bond (or mono ethylenic unsaturation), especially $C_{3-18}$ or $C_{3-14}$ or $C_{3-10}$ or $C_{3-6}$ or $C_{3-5}$ or $C_{3-4}$ alkenylene, more especially $C_3$, $C_4$, $C_5$, $C_6$, $C_{10}$ and $C_{14}$ alkenylene, and most especially trimethylene containing one double bond, tetramethylene containing one double bond and pentamethylene containing one double bond; or such divalent saturated aliphatic chain having 3–18 carbon atoms and divalent aliphatic chain having 3–18 carbon atoms and one double bond which is substituted with 1–4 or 1–3 or 1–2 (or only 1) substituents individualy (i.e. same or mixed) selected from the group consisting of straight and branched chain lower alkyl such as methyl or tert.-butyl inclusive as defined above, and the like, especially $C_{1-4}$ or $C_{1-3}$ or $C_{1-2}$ alkyl; cyano; and/or straight and branched chain endo lower alkylene bridge linkage such as endo- -methylene, -methyl-methylene, -dimethyl-methylene, -ethyl-methylene, -methyl-ethyl-ethylene, -di-ethyl-methylene, -ethylene, -methyl-ethylene, -dimethyl-ethylene, -ethyl-ethylene, -methyl-ethyl-ethylene, -propylene, -butylene, etc., and the like, especially $C_{1-6}$ or $C_{1-5}$ or $C_{1-4}$ or $C_{1-3}$ or $C_{1-2}$ endo alkylene;

$x$ represents a whole number from 1 to 2, i.e., 1 or 2;

$R_3$ represents $y$-valent straight and branched chain alkyl of 1–16 carbon atoms such as methyl to tert.-butyl inclusive as defined above, n- and iso-amyl, hexyl, heptyl, octyl, nonyl, decyl, undecyl, dodecyl, tridecyl, tetradecyl, pentadecyl, hexadecyl, and the like, especially $C_{1-14}$ or $C_{1-12}$ or $C_{1-10}$ or $C_{1-8}$ or $C_{1-6}$ or $C_{1-5}$ or $C_{1-4}$ or $C_{1-3}$ or $C_{1-2}$ alkyl;

$y$-valent straight and branched chain lower alkenyl such as vinyl, α-, β- and γ-allyl (i.e. prop-2-enyl, 1-methyl-vinyl and prop-1-enyl), but- 1, 2 and 3-enyl, and the like, especially $C_{2-4}$ or $C_{3-4}$ alkenyl;

$y$-valent cycloalkyl having 5–6 ring carbon atoms such as cyclopentyl, cyclohexyl, and the like, especially cyclohexyl;

$y$-valent cycloalkyl-lower alkyl having 5–6 ring carbon atoms in the cycloalkyl moiety such as cyclopentyl, cyclohexyl, and the like, substituted methyl to tert.-butyl inclusive as defined above, and the like, especially $C_{5-6}$ cycloalkyl-$C_{1-4}$ or $C_{1-3}$ of $C_{1-2}$ alkyl;

$y$-valent aryl-lower alkyl having 6–10 ring carbon atoms in the aryl moiety and having at least one corresponding isocyanate group or —NH—CO— group (i.e. N—C=O linkage) in the lower alkyl moiety, i.e. including mono and di nuclear aryl, such as phenyl, naphthyl, and the like, substituted methyl to tert.-butyl inclusive as defined above, and the like, especially $C_{6-10}$ aryl-$C_{1-4}$ alkyl, and more especially phenyl-$C_{1-4}$ or $C_{1-3}$ or $C_{1-2}$ alkyl;

$y$-valent lower alkyl-aryl-lower alkyl having 6–10 ring carbon atoms in the aryl moiety and having at least one corresponding isocyanate group or —NH—CO— group (i.e. N—C=O linkage) in one of the lower alkyl moieties, i.e. including mono and di nuclear aryl, such as methyl to tert.-butyl inclusive as defined above, and the like, substituted phenyl, naphthyl, and the like, -methyl to tert.-butyl inclusive as defined above, and the like, and especially $C_{1-4}$ alkyl-$C_{6-10}$ aryl-$C_{1-4}$ alkyl, and more especially $C_{1-4}$ alkyl-phenyl-$C_{1-4}$ or $C_{1-3}$ or $C_{1-2}$ alkyl; and such $y$-valent alkyl of 1–16 carbon atoms, $y$-valent lower alkenyl, $y$-valent cycloalkyl having 5–6 ring carbon atoms, $y$-valent cycloalkyl-lower alkyl having 5–6 ring carbon atoms in the cycloalkyl moiety, $y$-valent aryl-lower alkyl having 6–10 ring carbon atoms in the aryl moiety and $y$-valent lower alkyl-aryl-lower alkyl having 6–10 ring carbon atoms in the aryl moiety which is substituted with 1–3 or 1–2 (or even 1) substituents individually (i.e. same or mixed) selected from the group consisting of straight and branched chain lower alkyl such as methyl to tert.-butyl inclusive as defined above, and the like, especially $C_{1-4}$ or $C_{1-3}$ or $C_{1-2}$ alkyl;

halo such as chloro, bromo, iodo and fluoro, especially chloro;

cyano;

nitro;

straight and branched chain lower alkoxy such as methoxy to tert.-butoxy inclusive as defined above, and the like, especially $C_{1-4}$ or $C_{1-3}$ or $C_{1-2}$ alkoxy;

di straight and branched chain lower alkyl amino such as di (same as mixed) methyl to tert.-butyl inclusive as defined above, and the like, -amino, especially di $C_{1-4}$ or $C_{1-3}$ or $C_{1-2}$ alkyl amino;

carbo-aryloxy having 6–10 carbon atoms in the aryloxy moiety, including mono and di nuclear aryloxy, i.e. aryloxy-carbonyl, such as carbo-phenoxy, naphthaloxy, etc., and the like, especially carbo-phenoxy or phenoxy-carbonyl; and/or carbo-straight and branched chain lower alkoxy, i.e. lower alkoxy carbonyl, such as carbo-methoxy to tert.-butoxy inclusive as defined above, and the like, especially carbo $C_{1-4}$ or $C_{1-3}$ or $C_{1-2}$ alkoxy, i.e. $C_{1-4}$ or $C_{1-3}$ or $C_{1-2}$ alkoxy-carbonyl;

$y$ represents a whole number from 1 to 2, i.e. 1 or 2;

A—R' is an A-substituted radical corresponding to R;

A represents hydrogen when $x$ is 1; and the radical of the formula

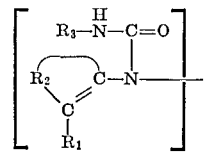

in which $R_1$, $R_2$ and $R_3$ are the same as defined above when $x$ is 2;

B—R₃' is a B-substituted radical corresponding to R₃; and

B represents hydrogen when y is 1; and
the radical of the formula

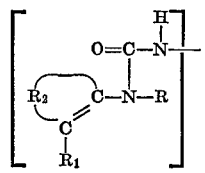

in which R, R₁ and R₂ are the same as defined above when y is 2.

Preferably, R is phenyl, naphthyl and halo (especially chloro) phenoxy phenyl when $x$ is 1, or phenylene and lower (especially $C_{1-4}$) alkylene-bis-phenyl when $x$ is 2, or substituted phenyl which is substituted with 1–3 or 1–2 substituents individually selected from the group consisting of lower (especially $C_{1-4}$) alkyl, trihalomethyl (especially trifluoromethyl), hydroxy, halo (especially chloro) and/or lower (especially $C_{1-4}$) alkoxy when $x$ is 1–2, especially 1; R₁ is hydrogen or lower (especially $C_{1-4}$ or $C_{1-3}$) alkyl and R₂ is cycloalkylidene such that the moiety

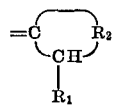

is cyclopentylidene, cyclohexylidene, bicyclo [2,2,1²·⁵]-heptylidene and cyclohexenylidene, or such -ylidene radical which is substituted with 1–4 or 1–3 or 1–2 (or even 1) substituents individually (i.e. same or mixed) selected from the group consisting of $C_{1-3}$ alkyl and cyano; $x$ is 1–2; R₃ is $C_{1-14}$ alkyl, $C_{2-4}$ alkenyl and cyclohexyl, or $C_{1-4}$ alkoxy-$C_{1-14}$ alkyl; y is 1–2; A-R' is an A-substituted radical corresponding to R; B—R₃' is a B-substituted radical corresponding to R₃; and A and B are hydrogen or such formulae radicals, respectively, as noted above.

In particular, R is phenyl, naphthyl, $C_{1-4}$ alkylene-bis-phenyl, phenoxy-phenyl, and each such radical which is substituted with 1–3 substituents individually selected from the group consisting of $C_{1-4}$ alkyl, trifluoromethyl, chloro and/or $C_{1-4}$ alkoxy; the moiety

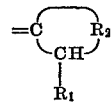

is cyclohexylidene; $x$ is 1–2; R₃ is $C_{1-14}$ alkyl, $C_3$ alkenyl, cyclohexyl and $C_{1-3}$ alkoxy-$C_{1-4}$ alkyl; y is 1–2; A-R' is an A-substituted radical corresponding to R; B-R₃ is a B-substituted radical corresponding to R₃; and A and B are hydrogen or such formulae radicals, respectively, as noted above.

Advantageously, the active compounds according to the present invention influence plant growth and can therefore be used as weedkillers. By weeds are meant in the widest sense all plants which grow in places where they are not desired. Whether the active compounds according to the present invention act as total or selective herbicides depends essentially on the amount applied as the artisan will appreciate.

While the active compounds can be used according to the pre-emergence method, they are also effective when used according to the post-emergence method, i.e. both before and after the emergence of the plants.

In general, the amounts of the active compound actually applied are substantially between about 0.5–50 kg./hectare, preferably between about 1–45 kg./hectare, apart from any carrier vehicle which may also be present.

The following Examples illustrate, without limitation, the herbicidal activity of the particular active compounds of the present invention.

EXAMPLE A

Pre-emergence test

Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is then added and the resulting concentrate is diluted with water to the desired final concentration.

Seeds of the test plants are sown in normal soil and, after 24 hours, watered with the preparation of the given active compound. It is expedient to keep constant the amount of water per unit area. The active compound concentration in the preparation is of no importance, only the amount of active compound applied per unit area being decisive. After three weeks, the degree of damage to the test plants is determined and characterized by the values 0–5, which have the following meaning:

0—no effect
1—slight damage or delay in growth
2—marked damage or inhibition of growth
3—heavy damage and only deficient development or only 50% emerged
4—plants partially destroyed after germination or only 25% emerged
5—plants completely dead or not emerged.

The particular active compounds tested, the amounts applied and the results obtained can be seen from the following Table 1.

TABLE 1.—PRE-EMERGENCE TEST

| Active compound | Concentration of active compound, kg./ha. | Echinochloa | Chenopodium | Sinapis | Stellaria | Lolium | Galinsoga | Matricaria | Oats | Cotton | Wheat | Buckwheat | Maize |
|---|---|---|---|---|---|---|---|---|---|---|---|---|---|
| | 40 | 5 | 5 | 5 | 5 | 5 | 5 | 5 | 5 | 4–5 | 5 | 5 | 2 |
| | 5 | 5 | 5 | 5 | 5 | 5 | 5 | 5 | 5 | 1–2 | 4–5 | 5 | 1 |
| | 2,5 | 5 | 5 | 5 | 5 | 4–5 | 5 | 5 | 5 | 0 | 4 | 5 | 0 |
| | 1,25 | 4 | 4–5 | 4–5 | 5 | 4 | 5 | 4–5 | 4 | 0 | 4 | 4–5 | 0 |

TABLE 1—Continued

| Active compound | Concentration of active compound, kg./ha. | Echinochloa | Chenopodium | Sinapis | Stellaria | Lolium | Galinsoga | Matricaria | Oats | Cotton | Wheat | Buckwheat | Maize |
|---|---|---|---|---|---|---|---|---|---|---|---|---|---|
| Cl—C₆H₄—N(C₆H₁₁)—C(=O)—NH—CH₃ | 20 | 5 | 5 | 5 | 5 | 5 | 5 | 5 | 5 | 3-4 | 4-5 | ......... | 4 |
|  | 10 | 5 | 5 | 5 | 5 | 5 | 5 | 5 | 4 | 2 | 4 | ......... | 2 |
|  | 5 | 5 | 5 | 5 | 5 | 4-5 | 5 | 5 | 3 | 0 | 4 | ......... | 1 |
|  | 2,5 | 4 | 4 | 4-5 | 5 | 4 | 5 | 5 | 2 | 0 | 3 | ......... | 0 |
| C₆H₅—N(C₆H₁₁)—C(=O)—NH—CH₂CH=CH₂ | 40 | 5 | 5 | 5 | 5 | 5 | 5 | 5 | 5 | 5 | 4-5 | ......... | 3 |
| C₆H₅—N(C₆H₁₁)—C(=O)—NH—C₃H₇ | 40 | 5 | 5 | 5 | 5 | 5 | 5 | 5 | 4-5 | 4-5 | 4-5 | ......... | 4 |
| CH₃—C₆H₄—N(C₆H₁₁)—C(=O)—NH—CH₃ | 40 | 5 | 5 | 5 | 5 | 5 | 5 | 5 | 5 | 5 | 4-5 | ......... | 4 |
| 3,4-Cl₂—C₆H₃—N(C₆H₁₁)—C(=O)—NH—CH₃ | 40 | 5 | 5 | 5 | 5 | 4-5 | 5 | 4-5 | 4 | 4 | 4 | ......... | 3 |
| F₃C—C₆H₄—N(C₆H₁₁)—C(=O)—NH—CH₃ | 20 | 5 | 5 | 5 | 5 | 5 | 5 | 5 | 4 | 1 | 4 | ......... | 4 |
|  | 10 | 5 | 5 | 5 | 5 | 4-5 | 5 | 5 | 3 | 0 | 4 | ......... | 3 |
|  | 5 | 4-5 | 4-5 | 5 | 5 | 4 | 5 | 5 | 1 | 0 | 4 | ......... | 2 |
|  | 2,5 | 4 | 4 | 4 | 5 | 3 | 5 | 5 | 0 | 0 | 2 | ......... | 0 |

EXAMPLE B

Post-emergence test

Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is then added and the resulting concentrate is diluted with water to the desired final concentration.

Test plants which have a height of about 5-15 cm. are sprayed with the given active compound preparation until just dew moist. After three weeks, the degree of damage to the plants is determined and characterized by the values 0-5, which have the following meaning:

0—no effect
1—a few slightly burnt spots
2—marked damage to leaves
3—some leaves and parts of stalks partially dead
4—plant partially destroyed
5—plant completely dead.

The particular active compounds tested, their concentrations and the results obtained can be seen from the following Table 2.

TABLE 2.—POST-EMERGENCE TEST

| Active compound | Concentration of active compound, kg./ha. | Echinochloa | Chenopodium | Sinapis | Galinsoga | Stellaria | Urtica | Matricaria | Daucus | Carrots | Oats | Cotton | Wheat | Beans |
|---|---|---|---|---|---|---|---|---|---|---|---|---|---|---|
| C₆H₅—N(C₆H₅)—C(=O)—NH—CH₃ | 10 | 5 | 5 | 5 | 5 | 5 | 5 | 5 | 5 | ......... | 5 | 4-5 | 4-5 | 4-5 |
|  | 5 | 5 | 5 | 5 | 5 | 5 | 5 | 5 | 5 | ......... | 5 | 4-5 | 4 | 4-5 |
|  | 2,5 | 5 | 5 | 5 | 5 | 5 | 5 | 5 | 5 | ......... | 4-5 | 4 | 3 | 4 |
|  | 1,25 | 5 | 5 | 5 | 5 | 4 | 4-5 | 3 | 4-5 | ......... | 4 | 3 | 3 | 4 |
| Cl—C₆H₄—N(C₆H₁₁)—C(=O)—NH—CH₃ | 5 | 5 | 5 | 5 | 5 | 5 | 5 | 5 | ......... | 5 | 4-5 | 3 | 4 | ......... |
|  | 2,5 | 5 | 5 | 5 | 5 | 5 | 5 | 5 | ......... | 5 | 4 | 1 | 2-3 | ......... |
|  | 1,25 | 4-5 | 5 | 4-5 | 4-5 | 5 | 5 | 4 | ......... | 3 | 3 | 0 | 1 | ......... |
|  | 0,6250 | 4 | 5 | 4-5 | 4 | 4 | 5 | 3 | ......... | 2 | 1 | 0 | 0 | ......... |
| C₆H₅—N(C₆H₁₁)—C(=O)—NH—C₃H₇ | 5 | 4 | 4 | 5 | 3 | 2 | 5 | 1 | ......... | 2 | 3 | 3 | 4 | ......... |
|  | 2,5 | 2 | 2 | 5 | 2 | 0 | 4 | 0 | ......... | 2 | 3 | 3 | 2 | ......... |
|  | 1,25 | 1 | 0 | 5 | 1 | 0 | 0 | 0 | ......... | 2 | 3 | 1 | 0 | ......... |
|  | 0,625 | 0 | 0 | 3 | 0 | 0 | 0 | 0 | ......... | 1 | 1 | 0 | 0 | ......... |

TABLE 2—Continued

| Active compound | Concentration of active compound, kg./ha. | Echinochloa | Chenopodium | Sinapis | Galinsoga | Stellaria | Urtica | Matricaria | Daucus | Carrots | Oats | Cotton | Wheat | Beans |
|---|---|---|---|---|---|---|---|---|---|---|---|---|---|---|
| CH₃—⟨⟩—N—⟨⟩ \| C=O \| NH—CH₃ | 5<br>2,5<br>1,25<br>0,625 | 5<br>3-4<br>3<br>1 | 5<br>4-5<br>3<br>0 | 5<br>4-5<br>3<br>3 | 5<br>4-5<br>3<br>0 | 5<br>3-4<br>2<br>0 | 5<br>4<br>3<br>1 | 3<br>1<br>0<br>0 | —<br>—<br>—<br>— | 2<br>0<br>0<br>0 | 3<br>1<br>0<br>0 | 1-2<br>0<br>0<br>0 | 3<br>1<br>0<br>0 | —<br>—<br>—<br>— |
| Cl—⟨Cl⟩—N—⟨⟩ \| C=O \| NH—CH₃ | 5<br>2,5<br>1,25<br>0,625 | 5<br>4-5<br>4<br>3 | 5<br>5<br>5<br>3 | 5<br>5<br>5<br>5 | 5<br>4<br>3<br>2 | 5<br>5<br>4-5<br>2 | 5<br>5<br>5<br>2 | 5<br>4<br>3<br>1 | —<br>—<br>—<br>— | 3<br>1<br>0<br>0 | 3<br>1-2<br>0<br>0 | 1-2<br>0<br>0<br>0 | 3<br>2<br>0<br>0 | —<br>—<br>—<br>— |
| F₃C—⟨⟩—N—⟨⟩ \| C=O \| NH—CH₃ | 10 | 5 | 5 | 5 | 5 | 5 | 5 | 4-5 | — | 4 | 4-5 | 3 | 4-5 | — |

The following Examples are set forth to illustrate, without limitation, the manner of producing the instant compounds according to the process of the present invention.

EXAMPLE 1

N-cyclohex-1-enyl-N-phenyl-N'-methyl-urea 692 g. (4.0 mols) cyclohexylidene-imino-benzene are added dropwise at 20–30° C. to 240 g. (4.20 mols) methylisocyanate, and the solution is then stirred until the mildly exothermic reaction has subsided. Heating is subsequently effected and the temperature, according to the consumption of the methyl-isocyanate boiling at the reflux condenser, is increased from 60 to 80° C. After about two hours the reaction is complete and the reaction mixture is taken up still hot with about 900 ml. acetonitrile. After cooling, 805 g. (87% of the theory) of the above urea are obtained in colorless polyhedrons of m.p. 147–150° C. After recrystallization again from acetonitrile, the m.p. is 151–152° C.

*Analysis.*—$C_{14}H_{18}N_2O$ (230.3) Calc.: C, 7.30; H, 7.9; N, 12.2. Found: C, 72.7; H, 7.7; N, 12.5.

EXAMPLE 2

N-cyclohex-1-enyl-N-(2'',6''-diethyl-4''-methyl-phenyl)-N'-methylurea 121 g. (0.5 mol) 1-cyclohexylidene-imino-2,6-diethyl-4-methyl-benzene and 29 g. (0.5 mol) methyl-isocyanate are stirred for 3 hours at 80° C. By recrystallization from 200 ml. acetonitrile, 132 g. of the above urea of m.p. 88–90° C., are obtained:

*Analysis.*—$C_{19}H_{28}N_2O$ (300.5) Calc.: C, 76.0; H, 9.4; N, 9.3. Found: C, 75.7; H, 9.6; N, 9.5.

EXAMPLE 3

1,6-bis-(N-cyclohex-1-enyl-N-phenyl-amino-carbonyl-amino)-hexane 139 g. (0.8 mol) cyclohexylidene-imino-benzene and 67 g. (0.4 mol) hexamethylene-diisocyanate are heated to 90° C. for 1.5 hours. The reaction mixture, a crystal slurry, is recrystallized from 400 ml. acetonitrile. 155 g. of the above urea are obtained in the form of yellow polyhedrons of m.p. 144–147° C.

*Analysis.*—$C_{32}H_{42}N_4O_2$ (514.7) Calc.: C, 74.7; H, 8.2; N, 10.9. Found: C, 74.3; H, 8.2; N, 11.1.

EXAMPLE 4

N-cyclohex-1-enyl-N-phenyl-N'-n-propyl-urea 104 g. (0.6 mol) cyclohexylidene-imino-benzene and 51 g. (0.6 mol) n-propyl-isocyanate are stirred at 80° C. for 5 hours. Recrystallization from light petroleum (of b.p. range 60–95° C.) is effected and the above urea is obtained as a waxy yellow substance which, after pressing on clay, melts at 76–78° C. Yield: 120 g.

*Analysis.*—$C_{16}H_{22}N_2O$ (258.4) Calc.: N, 10.8. Found: N, 10.7.

EXAMPLE 5

N-cyclohex-1-enyl-N-phenyl-N'-n-tetradecyl-urea 104 g. (0.6 mol) cyclohexylidene-imino-benzene and 143.5 g. (0.6 mol) n-tetradecyl-isocyanate are heated to 80–90° C. for 6 hours. By recrystallization from 200 ml. acetonitrile, 228 g. of yellow polyhedrons of m.p. 57–59° C. are obtained.

*Analysis.*—$C_{27}H_{44}N_2O$ (412.7) Calc.: N, 6.8. Found: N, 7.0.

EXAMPLE 6

N-cyclohex-1-enyl-N-phenyl-N'-methoxymethyl-urea 173 g. (1 mol) cyclohexylidene-imino-benzene and 87 g. (1 mol) methoxymethyl-isocyanate are heated to 80° C. for 3 hours. Stirring with 250 ml. light petroleum (of b.p. range 60–95° C.) is then effected and 247 g. of the above urea are obtained as yellow waxy substance, the m.p. of which, after pressing on clay, is 64–68° C.

*Analysis.*—$C_{15}H_{20}N_2O_2$ (260.4) Calc.: C, 69.2; H, 7.7; N, 10.8. Found: C, 68.8; H, 7.8; N, 11.0.

EXAMPLE 7

N-cyclohex-1-enyl-N-(4''-chloro-phenyl)-N'-methyl-urea 23 g. (0.4 mol) methyl-isocyanate are added dropwise at 10–15° C. to a solution of 83 g. (0.4 mol) 4-cyclohexylidene-imino-chlorobenzene in 100 ml. acetonitrile. Stirring is then continued for 5 hours at 60° C. After cooling, the above urea crystallizes out in colorless polyhedrons of m.p. 155–162° C. The yield is 69 g. By recrystallization again from acetonitrile, the pure product of m.p. 168–170° C. is obtained.

*Analysis.*—$C_{14}H_{17}ClN_2O$ (264.8) Calc.: C, 63.5; H, 6.5; N, 10.6. Found: C, 63.2; H, 6.6; N, 10.7.

EXAMPLE 8

N-cyclohex-1-enyl-N-(4''-methyl-phenyl)-N'-methyl-urea 131 g. (0.7 mol) 4-cyclohexylidene-imino-toluene and 40 g. (0.7 mol) methyl-isocyanate are heated to 100° C. for 30 minutes. From acetonitrile, 113 g. of the above urea are obtained in yellow polyhedrons of m.p. 149–151° C.

*Analysis.*—$C_{15}H_{20}N_2O$ (244.4) Calc.: N, 11.5. Found: N, 11.6.

EXAMPLE 9

N-cyclohex-1-enyl-N-phenyl-N'-α-allyl-urea 50 g. (0.6 mol) α-allyl-isocyanate (i.e. prop-2-enyl-isocyanate) and 104 g. (0.6 mols) cyclohexylidene-imino-benzene are heated to 80–85° C. for 3 hours, and 150 g. light petroleum (of b.p. range 60–95° C.) are then added. After cooling, 79 g. of the above urea, i.e. N-cyclohex-1-enyl-N-phenyl-N'-prop-2''-enyl-urea, are obtained as waxy substance. After pressing on clay, the m.p. is 65–66° C.

Analysis.—$C_{16}H_{20}N_2O$ (256.4) Calc.: C, 75.0; H, 7.9; N, 10.9. Found: C, 74.6; H, 8.1; N, 10.7.

EXAMPLE 10

N-cyclohex-1-enyl-N-phenyl-N'-cyclohexyl-urea 75 g. (0.6 mol) cyclohexylisocyanate are added dropwise at room temperature to 104 g. (0.6 mol) cyclohexylidene-imino-benzene and subsequently stirred for 3.5 hours at 80° C. and 1 hour at 100° C. The reaction mixture is stirred with 150 ml. light petroleum (of b.p. range 60–95° C.) and filtered off cold with suction. The above urea is obtained as waxy substance. Yield: 94 g.

Analysis.—$C_{19}H_{26}N_2O$ (298.4) Calc.: N, 9.4. Found: N, 9.8.

EXAMPLE 11

N-cyclohex-1-enyl-N-(3'',4''-dichloro-phenyl)-N'-methyl-urea 121 g. (0.5 mol) 1-cyclohexylidene-imino-3,4-dichloro-benzene and 29 g. (0.5 mol) methylisocyanate are heated to 75° C. for 5 hours. After recrystallization from 200 ml. acetonitrile, 95 g. of the above urea are obtained in beige polyhedrons of m.p. 160–164° C. After recrystallization again from acetonitrile, the m.p. is 166–168° C.

Analysis.—$C_{14}H_{16}Cl_2N_2O$ (299.2) Calc.: C, 56.2; H, 5.4; N, 9.4; Found: C, 56.1; H, 5.6; N, 9.4.

EXAMPLE 12

N-cyclohex-1-enyl-N-(3''-trifluoromethyl-phenyl)-N'-methyl-urea 72.5 g. (0.3 mol) 1-cyclohexylidene-imino-3-trifluoromethyl-benzene and 17.5 g. (0.3 mol) methylisocyanate are stirred at 80° C. for 6 hours. From acetonitrile, 42 g. of the above urea are obtained in colorless polyhedrons of m.p. 131–134° C. The m.p. of the pure compound, which is obtained by further recrystallization, is 139–141° C.

Analysis.—$C_{15}H_{17}F_3N_2O$ (298.3) Calc.: C, 60.4; H, 5.7; N, 9.4. Found: C, 60.8; H, 5.8; N, 9.2.

EXAMPLE 13

N-cyclohex-1-enyl-6-(4''-trifluoromethyl-phenyl)-N'-methyl-urea 72.5 g. (0.3 mol) 1-cyclohexylidene-imino-4-trifluoromethyl-benzene and 17.5 g. (0.3 mol) methylisocyanate are heated to 80° C. for 6 hours. After recrystallization from acetonitrile, the above urea is obtained as colorless substance of m.p. 125–129° C. After recrystallization again from acetonitrile, the m.p. is 135–137° C. Yield: 46 g.

Analysis.—$C_{15}H_{17}F_3N_2O$ (298.3) Calc.: N, 9.4. Found: N, 9.4.

EXAMPLE 14

N-cyclohex-1-enyl-N-α-naphthyl-N'-methyl-urea 78 g. (0.35 mol) 1-cyclohexylidene-imino-α-naphthalene and 20 g. (0.35 mol) methylisocyanate are heated to 80° C. for 6 hours. The reaction mixture solidifies into a solid, colorless substance and is recrystallized from a little acetonitrile. 66 g. of the above urea of m.p. 146–149° C. are obtained.

Analysis.—$C_{18}H_{20}N_2O$ (280.4) Calc.: N, 10.0. Found: N, 10.3.

EXAMPLE 15

N-cyclohex-1-enyl-N-(3''-chloro-4''-methoxy-phenyl) N'-methyl-urea 71.5 g. (0.3 mol) 1-cyclohexylidene-imino-3-chloro-4-methoxy-benzene and 17.5 g. (0.3 mol) methylisocyanate are stirred at 80° C. for 6 hours. From ethyl acetate, 61 g. of the above urea of m.p. 90–102° C. are obtained. After recrystallization again from ethyl acetate, the m.p. is 105–108° C.

Analysis.—$C_{15}H_{19}ClN_2O_2$ (294.8) Calc.: C, 61.1; H, 6.5; N, 9.5. Found: C, 60.7; H, 6.7; N, 9.7.

EXAMPLE 16

N-cyclohex-1-enyl-N-(3''-chloro-4''-methyl-phenyl) N'-methyl-urea 66.5 g. (0.3 mol) 1-cyclohexylidene-imino-3-chloro-4-methyl-benzene and 17.5 g. (0.3 mol) methylisocyanate are stirred at 70° C. for 7 hours. After recrystallization from acetonitrile, 38 g. the above urea are obtained in yellow polyhedrons of m.p. 152–154° C.

Analysis.—$C_{15}H_{19}ClN_2O$ (278.8) Calc.: N, 10.1. Found: N, 10.1.

EXAMPLE 17

N-cyclohex-1-enyl-N-(3''-chloro-4''-trifluoromethyl-phenyl)-N'-urea 68.9 g. (0.25 mol) 1-cyclohexylidene-imino-3-chloro-4-trifluoromethyl-benzene and 14.5 g. (0.25 mol) methylisocyanate are stirred at 80° C. for 6 hours. After recrystallization from light petroleum (of b.p. range 60–95° C.), 42 g. of the above urea are obtained in colorless polyhedrons of m.p. 118–120° C.

Analysis.—$C_{15}H_{16}ClF_3N_2O$ (332.8) Calc.: C, 54.1; H, 4.9; N, 8.4. Found: C, 53.9; H, 4.8; N, 8.3.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. An N,N'-substituted urea of the formula $$\begin{array}{c} R'-N-C \\ | \quad\quad \diagdown \\ R_3-N-C \quad\quad R_2 \\ H \quad || \quad\quad \diagup \\ O \quad R_1 \end{array}$$

in which $R_1$ is hydrogen, lower alkyl or cyano, $R_2$ is trimethylene, tetramethylene or pentamethylene, $R_3$ is alkyl of 1–14 carbon atoms, lower alkenyl, cycloalkyl of 5–6 carbon atoms or lower alkoxy-lower alkyl, and R' is phenyl or naphthyl unsubstituted or substituted by at least one of chloro, trifluoromethyl, lower alkyl and lower alkoxy.

2. A compound selected from the group consisting of

N-cyclohex-1-enyl-N-phenyl-N'-methyl-urea,

N-cyclohex-1-enyl-N-(2'',6''-diethyl-4''-methyl-phenyl) N'-methyl-urea, 1,6-bis-(N - cyclohex - 1 - enyl-N-phenyl-amino-carbonylamino)-hexane, N-cyclohex-1-enyl-N-phenyl-N'-n-propyl-urea, N-cyclohex-1-enyl-N-phenyl-N'-tetradecyl-urea, N-cyclohex-1-enyl-N-phenyl-N'-methoxymethyl-urea, N-cyclohex - 1 - enyl-N-(4''-chloro-phenyl)-N'-methyl-urea, N-cyclohex - 1 - enyl-N-(4''-methyl-phenyl)-N'-methyl-urea, N-cyclohex-1-enyl-N-phenyl-N'-α-allyl-urea, N-cyclohex-1-enyl-N-phenyl-N'-cyclohexyl-urea, N-cyclohex - 1 - enyl - N - (3'',4''-dichloro-phenyl)-N'-methyl-urea, N-cyclohex-1-enyl-N-(3''-trifluoromethyl-phenyl)-N'-methyl urea,
N-cyclohex-1-enyl-N-(4''-trifluoromethyl-phenyl)-N'-methyl-urea,
N-cyclohex-1-enyl-N-α-naphthyl-N'-methyl-urea,
N-cyclohex-1-enyl-N-(3''-chloro-4''-methoxy-phenyl)-N'-methyl-urea,
N-cyclohex-1-enyl-N-(3''-chloro-4''-methyl-phenyl)-N'-methyl-urea, and
N-cyclohex-1-enyl-N-(3''-chloro-4''-trifluoromethyl-phenyl)-N'-methyl-urea.

3. A compound selected from group consisting of N-3-trifluoromethylphenyl-N-cyclohex-1-enyl-N'-methylurea, N-3,4-dichlorophenyl-N-cyclohex-1-enyl-N'-methylurea, N-4-chlorophenyl-N-cyclohex-1-enyl-N'-methylurea, N-4-methoxy-3-chlorophenyl-N-cyclohex-1-enyl-N'-methylurea, and N-phenyl-N-cyclohex-1-enyl-N$^1$-methylurea.

4. N-phenyl-N-cyclohex-1-enyl-N'-methylurea.

References Cited
UNITED STATES PATENTS

| | | | |
|---|---|---|---|
| 2,709,648 | 5/1955 | Ryker et al. | 260—553 A X |
| 2,801,911 | 8/1957 | Gilbert et al. | 260—553 A X |
| 2,876,088 | 3/1959 | Hill et al. | 260—553 A X |

FOREIGN PATENTS

| | | | |
|---|---|---|---|
| 1,533,797 | 6/1968 | France. | |
| 1,481,308 | 4/1967 | France | 260—553 R |

LEON ZITVER, Primary Examiner

M. W. GLYNN, Assistant Examiner

U.S. Cl. X.R.

260—75 TN, 453 A, 465 R, 482 R, 490, 566 R; 71—105, 120; 106—3